United States Patent [19]

Hegelmann et al.

[11] Patent Number: 5,273,485
[45] Date of Patent: Dec. 28, 1993

[54] APPARATUS FOR MECHANICALLY PROCESSING POULTRY BODIES

[75] Inventors: Heinz-Dieter Hegelmann, Lübeck; Bernd Zblewski, Bad Schwartau, both of Fed. Rep. of Germany

[73] Assignee: Nordischer Maschinenbau Rud. Baader GmbH + Co. KG, Lubeck

[21] Appl. No.: 962,819

[22] Filed: Oct. 19, 1992

[30] Foreign Application Priority Data

Oct. 19, 1991 [DE] Fed. Rep. of Germany ....... 4134621

[51] Int. Cl.⁵ .................. A22C 21/00; A22C 25/18
[52] U.S. Cl. .................... 452/179; 452/130; 452/153; 452/165; 452/170
[58] Field of Search ............. 452/130, 125, 163, 165, 452/170, 179, 160, 153

[56] References Cited

U.S. PATENT DOCUMENTS

| | | |
|---|---|---|
| 4,780,930 | 11/1988 | Sparkia ........................ 452/165 |
| 4,856,143 | 8/1989 | Callsen et al. ............... 452/130 |
| 4,918,788 | 4/1990 | Passchier ..................... 452/163 |
| 4,937,918 | 7/1990 | Martin .......................... 452/165 |
| 5,092,815 | 3/1992 | Polkinghorne ............... 452/163 |

FOREIGN PATENT DOCUMENTS 380714 8/1992 European Pat. Off. .
3736401 3/1989 Fed. Rep. of Germany .

Primary Examiner—Willis Little
Attorney, Agent, or Firm—Fay, Sharpe, Beall, Fagan, Minnich & McKee

[57] ABSTRACT

In an apparatus for the mechanical skinning and filleting of poultry bodies these are saddled on carriers and guided to pass corresponding processing tools. To achieve the objects of skinning in an optimal manner, on the one hand, and obtaining a high yield in fillet meat, on the other, the carriers are designed to pivot about a vertical axis and at least one reversing mechanism is provided for the carriers, one of such reversing mechanisms being arranged between a skinning tool and a tool for releasing the meat, this reversing mechanism serving for pivoting the carriers about 180°.

7 Claims, 1 Drawing Sheet

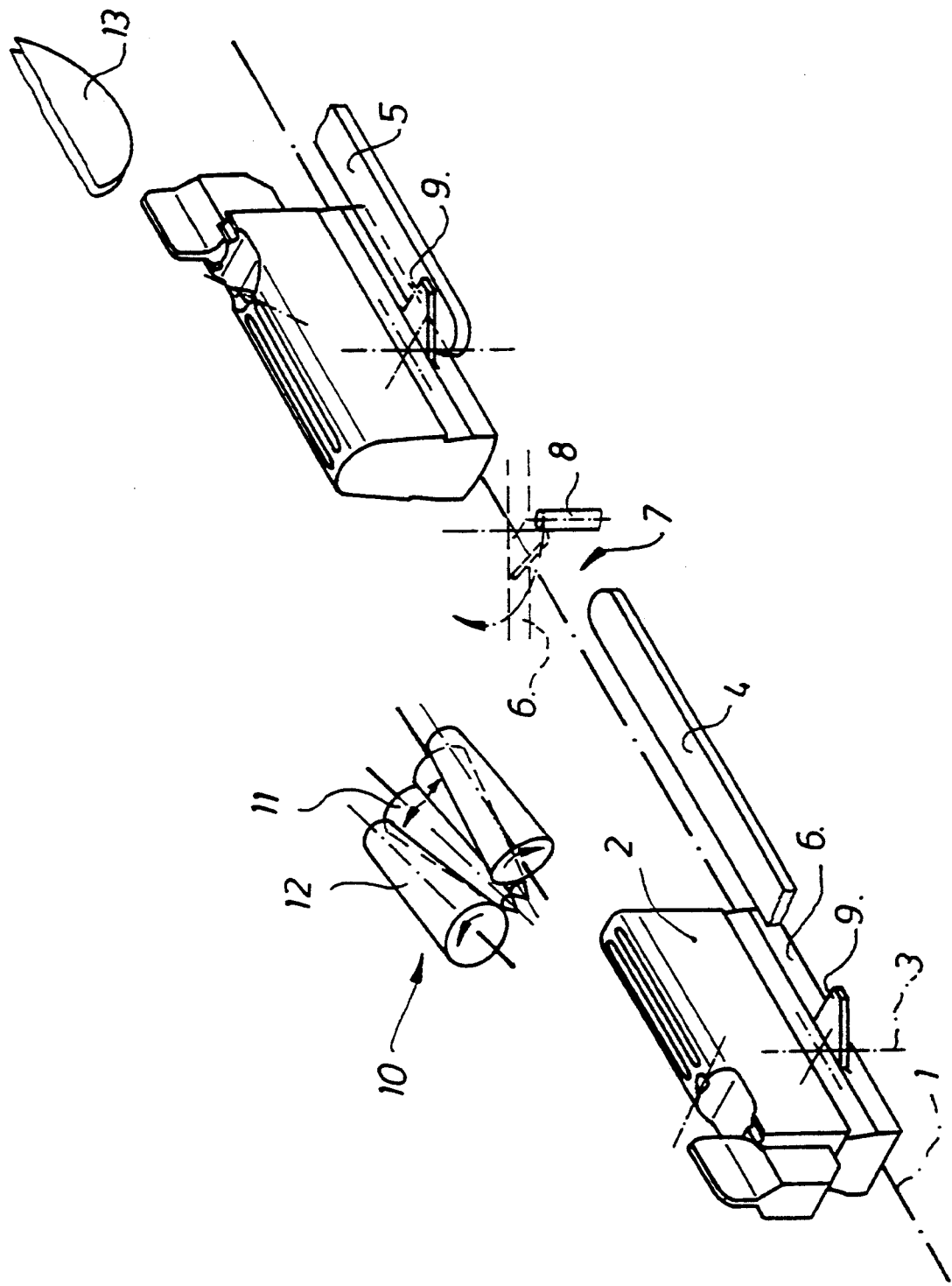

APPARATUS FOR MECHANICALLY PROCESSING POULTRY BODIES

BACKGROUND OF THE INVENTION

1. Field of the Invention

The invention relates to an apparatus which puts into practice a method for skinning poultry bodies and thus gaining skin free fillets by such a working process. In particular, use is made of an apparatus including a conveyor, which is normally equipped with carriers, receptacles or the like for holding the poultry bodies to be processed, and tools arranged along the path of that conveyor, which tools perform the skinning and detaching of the meat from the skeleton.

2. Prior Art

Such an apparatus can e.g. be formed by a combination of the devices known from German Patent 3736401 and European Patent Publication 0380714. In such apparatus, the processing of the poultry body is performed by starting from the front side thereof, because the anatomy of the poultry body allows for controlling the tools in a manner to enable a high yield in fillet meat.

In a fillet thus produced it is significant that on the fillet surface previously covered by the skin, fat inclusions or depositions are present which give the impression of "soiling" and thus are considered a quality-reducing feature. Therefore, attempts are made to remove the fat by rather cost-intensive manual processing in order to obtain a final product of the desired high quality. In the course of research and experiments carried out in this context it has been found that the fat depositions are fat components which are deposited below the skin and particularly in the forward area of the poultry body. It has been found as well that these fat components, at the beginning of the skinning process, are initially taken up together with the skin but in the further course of the processing, they are distributed over the skinned surface.

A further deficiency lies in that, quite frequently, the skin is torn during the skinning process, i.e. it is not gained in one piece and generally undamaged as desired, but relatively often skin patches remain on the body. This makes it impossible to use the skin as an edible packaging envelope for various poultry products, and, on the other hand, this also requires cost-intensive post-treatment.

3. Object of the Invention

It is therefore the main object of the present invention to suggest an apparatus which is capable of avoiding the above drawbacks.

SUMMARY OF THE INVENTION

In an apparatus for mechanically processing poultry bodies comprising a conveyor for conveying such poultry bodies along a predetermined conveying and processing path, tools for performing processing steps of skinning and of severing meat from the skeleton of the bodies, and carriers for retaining the poultry bodies during such conveying and processing, this object is achieved by arranging the carriers to be pivotable about a pivoting angle of 180°, the pivoting axis extending perpendicularly to the direction of movement of the carriers, and a reversing mechanism being provided between the skinning tool and a tool for detaching the meat.

Thus, it has been found that in a most surprising manner the disadvantageous effects of the prior art structure can be avoided by reversing the direction of skinning. As a consequence thereof, the main advantage of the processing to be performed with the apparatus according to the invention lies, on the one hand, in that the detaching of said fat components occurs at the end of the skinning process and thus in a more accurate and safe manner due to the more favourable anatomic conditions, and that, on the other hand, the filleting process may further be performed in a direction which is more favourable to this end.

According to a preferred embodiment of the present invention, a particularly simple and expedient reversing mechanism may be provided by arranging a laterally projecting catch in the base area of each carrier on both sides of the same and adjacent the pivoting axis, and that a fixedly arranged reversing or turn peg is provided, which is situated on one side of the path of the carriers and within the path of the catches. Furthermore, at least on one side just outside the path of the carriers, fixedly mounted guide elements may be arranged for guiding the carriers while aligning them longitudinally. Also, it is considered advantageous to form a gap between the guide elements in the region of the reversing peg.

BRIEF DESCRIPTION OF THE DRAWING

Other and further objects of the present invention will be apparent from the following description and claims and are illustrated in the accompanying drawing which by way of illustration schematically shows a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The sole FIGURE of the drawing shows a diagrammatic representation of a section of a poultry processing machine.

DETAILED DESCRIPTION OF THE DRAWING

In the machine shown in the drawing an endless chain conveyor 1 is used, which serves as a conveying device for the conveying of the poultry bodies to be treated during the processing thereof, which conveyor is equipped with saddle-shaped carriers or receptacles 2, mounted on a suitable, non-shown machine frame, and driven to rotate continuously in an appropriate manner. Each receptacle is mounted on a non-shown bracket attached to the chain conveyor 1, and is arranged to pivot about a vertical and centrally extending axis 3. First and second guide rails 4 and 5, respectively, are arranged on one side of the path along which the receptacles 2 move, which rails are made from material appropriate for this purpose, serve as guides for base bodies 6 of the receptacles 2 while aligning these in a longitudinal direction, and define a gap 7 between them, in whose region a reversing or turn peg 8 is mounted fixedly to the frame of the machine in a manner to rise up beside the path of the receptacles 2. Reversing peg 8 lies within the path of a catch 9, which is arranged on one side of the base body 6, with an equivalent catch being arranged on the other, opposite side of the base body 6 in a mirror inverted manner.

A skinning device 10 is arranged above the path of the receptacles 2 in the region of the first guide rail 4, which skinning device has a known per se structure and includes a pair of cone-shaped skinning rollers 11, each of which is associated with a corresponding stripping roller 12. In the region of the second guide rail 5 filleting tools are mounted, of which, for the sake of simplicity, only one double knife 13 for cutting free the sternum of the poultry body to be processed has been shown merely allusively.

The function of the device is as follows:

According to the structure of the device as shown in the drawing a poultry body to be processed is present in the form of a front-half, i.e. by way of a product obtained by an oblique section through the poultry body while severing the vertebral column, cutting out the same and severing the wings. Such front-half is saddled on the receptacle 2 with the back opening facing downwardly and the neck opening trailing.

In this manner, the poultry body portion is conveyed into the operative area of the skinning device 10, by which the skin is removed. This positioning relative to the conveying direction effects that firstly, those skin portions which are only attached relatively loosely can be taken up, whereas subsequently those skin portions which are more firmly attached in the head area of the body and connected with fat inclusions are removed.

When having passed the skinning device 10 the receptacle 2 which up until this moment has been guided in a longitudinal manner by the first guide rail 4 enters into the region of the gap 7 between the rails 4 and 5, so that the receptacle 2 is advanced further in an unguided manner by an appropriate, non-shown spring notch by which it is merely stopped. Thus released, the catch 9 which is arranged laterally on the base body 6 of the receptacle 2 hits against the reversing peg 8 which lies in its path, whereby a pivoting of the receptacle 2 about its axis 3 is initiated. When the catch 9 leaves the reversing peg 8 the pivoting of the receptacle 2 has been completed about a turn or swing angle which effects almost a transverse positioning of the receptacle 2. Thus, the base body 6 will run against the front edge of the second guide rail 5 so that on further progress of the conveyance the pivoting will be continued and completed by the base body 6 abutting against the guide rail 5 after a total pivot angle of 180°.

After the processing by filleting has been completed, a further reversing mechanism corresponding to the one described above safeguards a supplemental pivoting by a further 180°, so that the receptacle 2 will be ready for a new feeding cycle.

Apparently, there is also the option to arrange the reversing mechanisms in such a manner that the poultry bodies can be saddled in the direction most appropriate for the filleting process, while the reversing may occur just shortly before and after the skinning is taking place.

We claim:

1. An apparatus for the mechanical processing of poultry bodies for gaining skin-free poultry fillets, said apparatus comprising
   a) conveying means for conveying said poultry bodies to be processed along a predetermined processing path of said apparatus in a conveying direction;
   b) tool means arranged along said processing path for performing actions of skinning and of detaching meat from the skeleton of said bodies;
   c) carrier means for retaining said poultry bodies, which carrier means are arranged on said conveying means and include a pivot axis to pivot about a pivoting angle of essentially 180°, said pivot axis extending essentially perpendicular to said conveying direction; and
   d) a reversing mechanism positioned between said tool means for skinning and said tool means for detaching the meat.

2. An apparatus as claimed in claim 1, wherein each carrier means includes a base body in the region of which on both sides of each carrier means and adjacent to said pivot axis there are arranged laterally projecting catch means, each, and wherein said reversing mechanism includes fixedly arranged reversing means provided on one side of said path of said carrier means and within the path of said catch means.

3. An apparatus as claimed in claim 1, wherein fixedly arranged guide elements are provided at least on one side of said path of said carrier means, which guide elements guide said carrier means in longitudinal alignment.

4. An apparatus as claimed in claim 2, wherein fixedly arranged guide elements are provided at least on one side of said path of said carrier means, which guide elements guide said carrier means in longitudinal alignment.

5. An apparatus as claimed in claim 3, wherein said guide elements define a gap in the region of said reversing mechanism.

6. An apparatus as claimed in claim 4, wherein said guide elements define a gap in the region of said reversing means.

7. An apparatus as claimed in claim 2, wherein said reversing means are designed as a peg.

* * * * *